No. 716,813. Patented Dec. 23, 1902.
J. A. E. CRISWELL.
MACHINE FOR MAKING MATCHES.
(Application filed Feb. 15, 1901.)

(No Model.) 3 Sheets—Sheet 1.

WITNESSES:
William Foster
H. W. Stanley

INVENTOR
J. A. E. Criswell.

No. 716,813. Patented Dec. 23, 1902.
J. A. E. CRISWELL.
MACHINE FOR MAKING MATCHES.
(Application filed Feb. 15, 1901.)
(No Model.) 3 Sheets—Sheet 2.
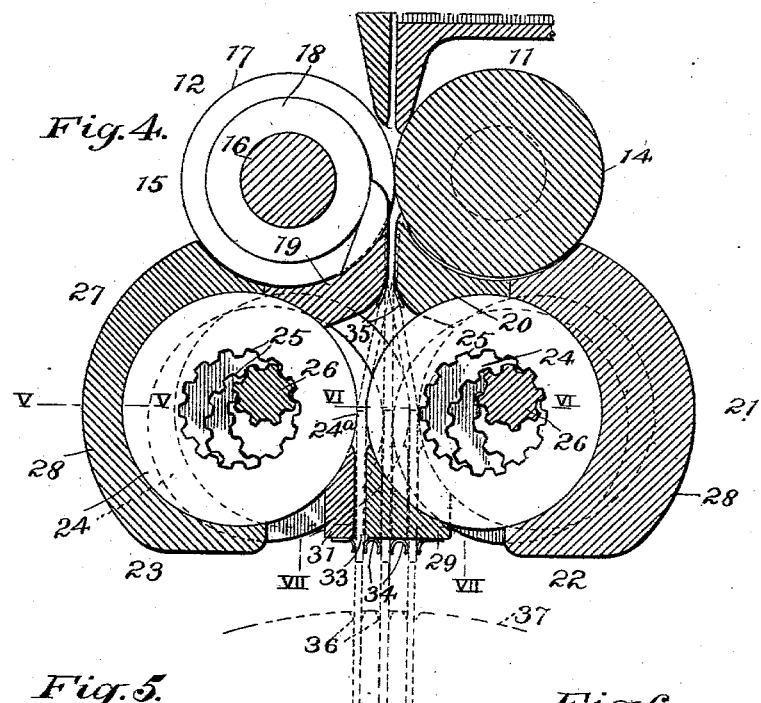
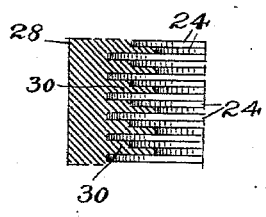
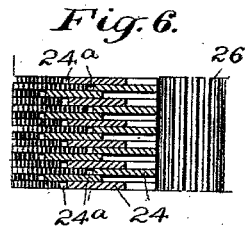
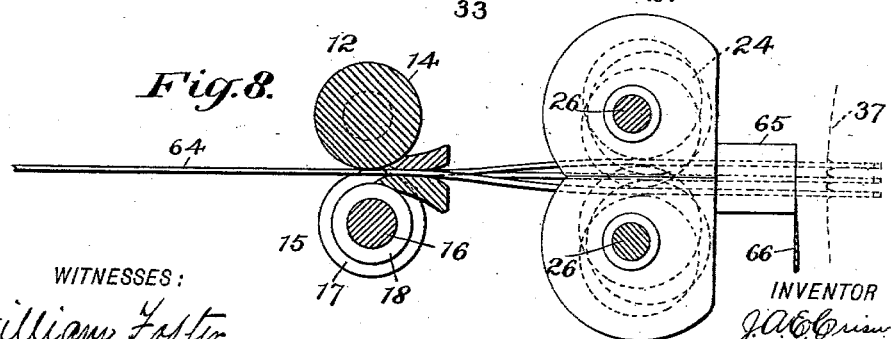
WITNESSES:
William Foster
A. W. Stanley
INVENTOR
J. A. E. Criswell No. 716,813. Patented Dec. 23, 1902.
J. A. E. CRISWELL.
MACHINE FOR MAKING MATCHES.
(Application filed Feb. 15, 1901.)
(No Model.) 3 Sheets—Sheet 3.
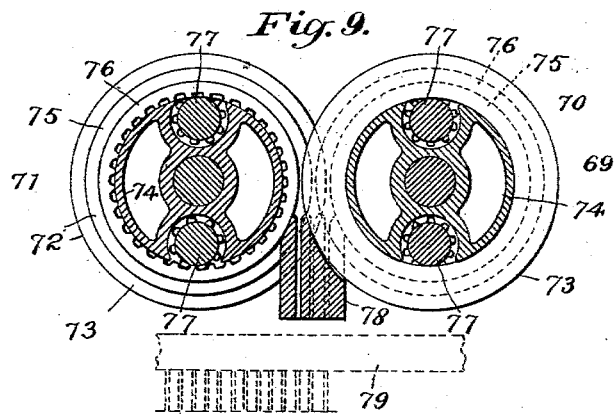
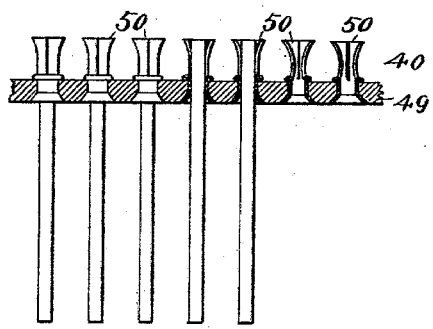
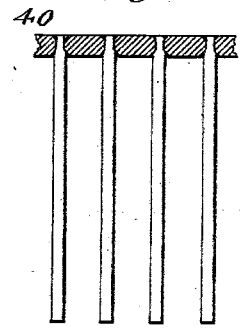
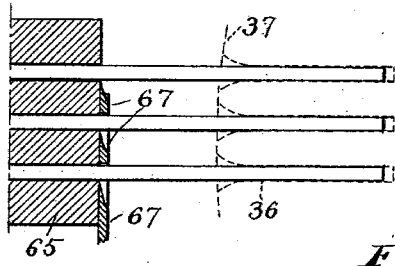
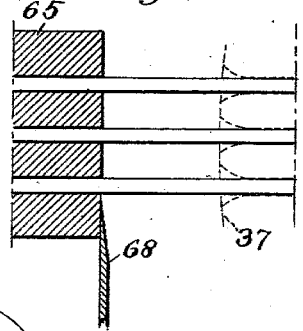
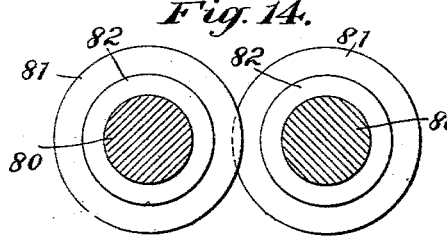
WITNESSES: INVENTOR

UNITED STATES PATENT OFFICE.

JAMES A. EKIN CRISWELL, OF NEW YORK, N. Y.

MACHINE FOR MAKING MATCHES.

SPECIFICATION forming part of Letters Patent No. 716,813, dated December 23, 1902.

Application filed February 15, 1901. Serial No. 47,433. (No model.)

*To all whom it may concern:*

Be it known that I, JAMES A. EKIN CRISWELL, of New York, county of Kings, and State of New York, have invented certain new and useful Improvements in Machines for Making Matches, of which the following is a full, clear, and exact description.

This invention relates to match-making machines, and more particularly to machines such as disclosed in my Patent No. 656,014, dated August 14, 1900, in which the splints are cut from veneer.

The primary object of the invention is to provide simple and efficient means by which the splints after being cut will be separated into independent rows and then discharged and held in such a manner that the splints will be under positive control from the time they are cut until they are held for completing the matches.

Another object is to provide a rotary separator which receives the splints endwise and separates them into more than two independent rows spaced apart and in position to be discharged into a carrier.

A further object of the invention is to provide a carrier into which the separated splints are discharged and by which the splints are transferred and finally positively forced into a second carrier or holding device.

With these and other objects in view the invention consists in the construction and combination of the several parts, substantially as hereinafter described and then pointed out in the claims at the end of the description.

Figure 1:
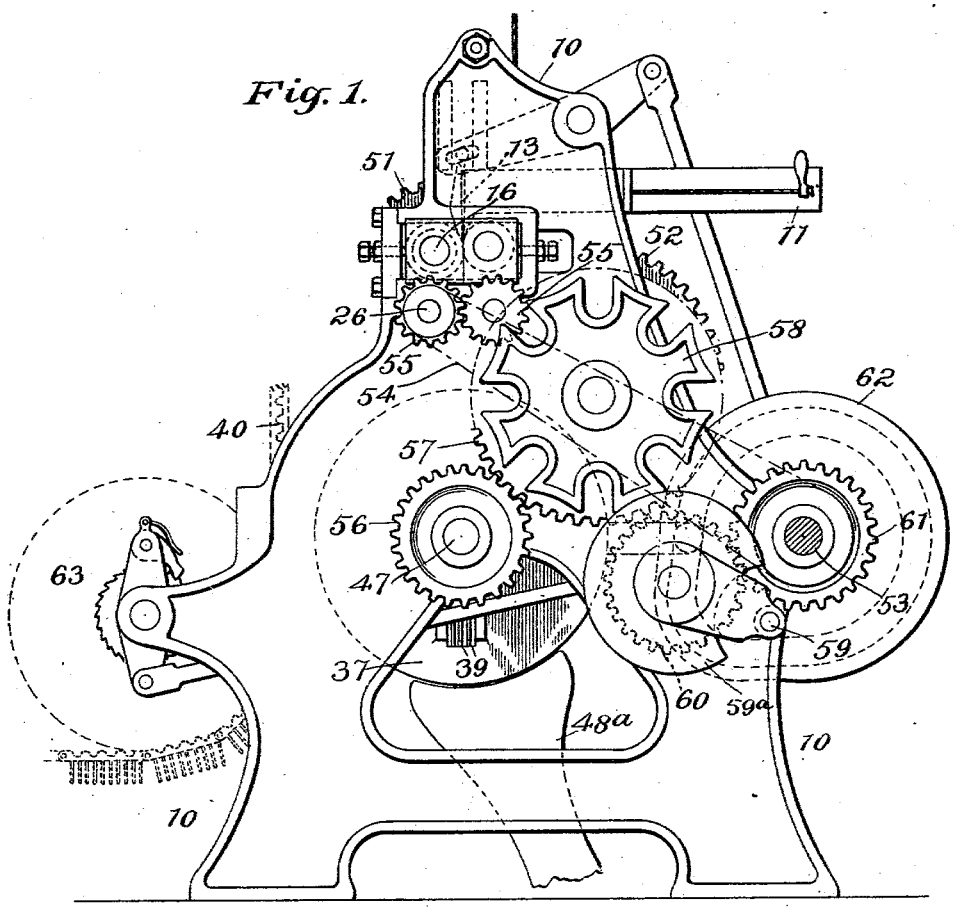
Figure 2:
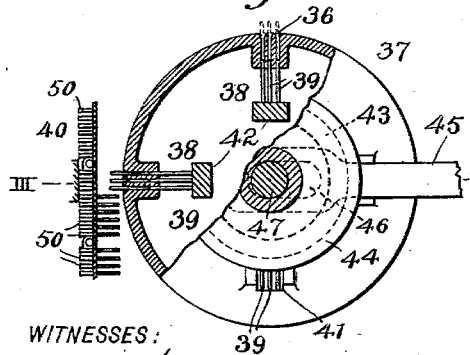
Figure 3:
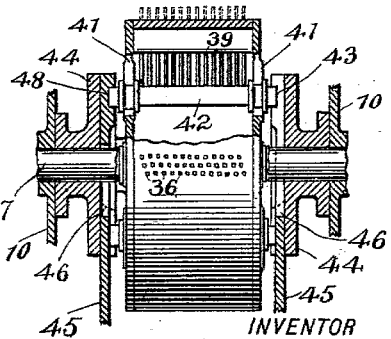

In the drawings, Figure 1 is a side elevation of one form of machine embodying my invention. Fig. 2 is a side elevation, partly in section, of the transfer-carrier. Fig. 3 is a sectional plan, partly in elevation, taken on the line III III of Fig. 2. Fig. 4 is a vertical section through the separator and the cutting device. Fig. 5 is a sectional plan, partly in elevation, taken on the line V V of Fig. 4. Fig. 6 is a sectional plan, taken on the line VI VI of Fig. 4. Fig. 7 is a sectional plan through the lower guide, taken on the line VII VII of Fig. 4. Fig. 8 shows how long strips of veneer may be cut into long splints, then separated, and the long splints cut into complete splints by a second cutting device. Fig. 9 shows a rotary separator with a different arrangement of independent plates. Figs. 10 and 11 show different forms of holding carriers or devices for the splints. Figs. 12 and 13 show different means for cutting the long splints transversely to form complete splints, and Fig. 14 shows another form of splint-cutting device.

The frame 10 may be variously constructed, and projecting outward from the frame is an open-ended box or hopper 11, in which are placed the veneer cards from which the splints are to be made. These cards are forced to a cutting device 12 by the reciprocating plunger 13, the cards being fed through the hopper and to the cutting device in substantially the same manner as described in my Patent No. 656,014, hereinbefore referred to, though it is to be understood that the cutting device and manner of feeding the splint material to said cutting device may be of any suitable construction.

The cutting device 12 is substantially the same as in my patent and comprises a metallic roll 14 and a cutter-roll 15. The roll 15 has a spindle 16, on which are a series of circular cutters 17. These cutters are beveled from both sides and are spaced apart the width of the splints by washers 18, and as constructed cut the splints in a close row. As the splints are cut a stripper or comb 19 prevents them from following the cutters and a like device or guide 20 prevents the splints from following the roll, the comb and the guide together serving to form a throat for the passage of the splints.

For the purpose of separating the splints into independent rows I provide a separator, as at 21. As shown, the separator consists of two opposed members 22 and 23, each of which comprises a series of independent circular plates 24 of the same diameter. These plates are eccentrically arranged with respect to each other and are stepped, so as to provide properly-spaced passages 24ᵃ to divide the splints into independent parallel rows. The plates are arranged in sets corresponding to the number of independent rows into which the splints are to be divided. In this case there are three sets, though this number may vary. The plates of one member fit between those of the other, and each plate is provided with internal teeth 25, which mesh with the teeth of the roll 26 of its member. As the gear-rolls 26 rotate the plates 24 of both of the members will be also rotated, and as said plates or devices are of the same diameter the peripheral speed of all the plates will be the same. The plates 24 of both members are held to rotate in the casing 27, which latter is formed by the backings 28, comb 19, guide 20, and the stripper and guide 29, though the manner of supporting the plates may vary, and instead of stationary supports rolls or a combination of movable and stationary surfaces may be employed. The comb and the guides each have fingers entering between the plates 24, and the backings 28 have fingers 30, which form bearing-surfaces and serve to guide and assist in keeping the plates in proper alinement. The guide 29 may be made in two separable sections 31 and 32, as shown in Fig. 7, and between them form independent rows of passages or channels 33, corresponding in position to the independent rows into which the splints are divided by the plates 24. This guide 29 may have spring-fingers 34 on its lower surface to prevent small or other splints from falling or being too readily displaced, and the throat formed by the guide 20 and comb 19 is flared and may also be provided with spring-fingers 35, which will guide the splints and will yield to permit some of the splints to be forced at right angles to the plane of the card or splint material as the splints are divided into the independent rows. By this means the splints as they are cut will be forced to the separating device and will be properly spaced apart and fed to the holding means or a carrier.

The splints after being cut and separated may be handled in various ways. As shown, the independent rows of splints as they are discharged from the separator enter holding devices 36 in a transfer-carrier 37. This carrier, Figs. 1, 2, and 3, is rotary and is in the form of a cylinder or drum and has a series of sets of holding devices adapted to receive successively the sets of independent rows of splints from the separator. Four sets of holding devices are shown; but any suitable number may be employed. A plunger device 38 for each set of holding devices is slidingly held within the drum or cylinder, and its plungers 39 are adapted to be forced through the holding devices 36 to eject the splints and to force them into a second carrier 40. The drum or carrier 37 has radial slots 41 for the plunger-heads 42, and the ends of said heads project beyond the drum and enter and normally travel in annular grooves 43 in the stationary disks or flanges 44. These stationary disks 44 each have a slot therethrough which intersects the annular groove 43, and movable in said slot is a reciprocatory lever 45. Each lever 45 has a slot 46, so as to span the carrier-shaft 47, and has a groove 48 in the end thereof, which normally registers with the annular groove 43. As the ends of the plunger devices travel in the annular grooves of the flanges 44 they will enter the grooves 48 of the levers, and as the latter are reciprocated the plunger device now engaged by the levers will be also reciprocated, and the splints will be forced from the drum into the second carrier 40. The plunger device will be immediately returned, to again enter the annular grooves 43 of the disks 44 when the drum is rotated. The drum or carrier 37 may thus be made to receive and to discharge independent rows of splints at the same time, and as the carrier rotates any dust, fiber, &c., left in the holding devices 36 will be removed by the pipe 48ª, which latter is connected to an exhaust-fan.

Any suitable carrier or holding means may be employed to hold the splints for treating them to complete the matches. In Fig. 11 is shown simply the usual plates with small holes to compress and hold the ends of the splints, while in Fig. 10 the plate 49 is provided with holes in which are fitted bushings 50, which yield sufficiently to clamp and properly hold the splints and is substantially the same as in the patent previously mentioned. The plates may be independent or may be hinged or linked together to adapt the machine for handling the splints and making the matches continuously.

The timing and operating mechanism for the several parts may be variously constructed and any desired form of mechanism may be employed. The cutter shaft or spindle 16 may have a gear 51, which meshes with an idler-gear 52, that meshes with a gear on the main drive-shaft 53. A sprocket-chain 54 may drive one of the gear-rolls of the separator from the shaft 53, as shown in dotted lines, and the two gear-rolls of the separator may have intermeshing gears 55, so as to rotate in unison. The shaft 47 of the transfer-carrier has a gear 56, that meshes with a larger gear 57. On the shaft of this latter gear is a slotted wheel or disk 58, that is intermittently operated by a stud 59 entering the slots of said wheel. Moving with the stud is a disk 59ª, which engages the periphery of the disk 58 between the slots in the manner usual in movements of this character, the gears 56 and 57 being so proportioned that one revolution of the latter will rotate the former twice. A gear 60 on the same shaft as the stud 59 meshes with a gear 61 on the drive-shaft 53, and as the latter rotates an intermittent movement will be imparted to the transfer-carrier and its shaft. The levers 45 are extended and have rollers on their ends which engage cam-grooves in the cams 62 on the drive-shaft and by which said levers are given a quick reciprocatory movement. A ratchet-and-pawl mechanism, as at 63, may be employed to operate the carrier 40.

The invention will be readily understood from the foregoing description when taken in connection with the accompanying drawings.

The cards are forced to the cutting device and the splints cut, as already explained. One set of splints will remain in the throat formed by the comb 19 and guide 20, and this set will be forced by those following to the separator. This latter set will be grasped by the plates 24 of the members 22 and 23 and will be separated into three independent rows. These rows of splints as they enter the channels 33 will force those already in said channels into the carrier 37. After the splints are received they will be carried bodily at once away from the separator and will be forced into the carrier 40 or other holding means in the manner previously described. This operation is repeated, and as the carrier or holding devices are filled with the successive sets of independent rows of splints they may be taken away and the matches completed by hand, or the holding devices may form an endless belt and the matches then completed automatically in the usual manner.

In Fig. 8 the strip of veneer 64 is cut into long splints by a cutting device similar to that already described and the long splints separated by a rotary separator similar to separator 21. The long splints pass in independent rows through the guide 65 and enter the holding devices in the transfer-carrier 37, and while thus engaged a reciprocatory knife 66 or other means will cut complete splints from the long splints. This knife 66 works across the face of the guide 65 and may consist of a series of knife-bars 67, as shown in Fig. 12, or it may consist of a single knife-bar 68, as shown in Fig. 13. The splints after being cut are transferred by the carrier 37 and the matches completed as already described or in any suitable manner.

The separator 69 (shown in Fig. 9) consists of two opposed members 70 and 71. The circular plates 72 in this case instead of being of the same diameter are of different diameters, and the plates of each member are arranged concentrically. Each member has a series of sets of independent plates 72. These sets of plates are all movable or one set is stationary and the others are movable. As shown, there are three sets of plates for each member, and the sets of plates of one member are opposed to the sets of plates of the other members to provide three independent rows of passages for the splints, though the number of rows will vary with the number of sets of plates. One set of plates, as 73, of each member is stationary and is held to rotate with the drum or cylinder 74. The sets of plates 75 and 76 are movable independent of the drum and are so timed that the peripheries or splint-engaging surfaces of all the sets of plates will be the same or substantially the same. The movable plates 75 and 76 are provided with internal teeth, which mesh with the gears 77. These gears are journaled in the drum 74 and rotate with said drum and the plates, and during such rotation will be operated by any suitable mechanism and at such a speed that the peripheries of the two movable sets will move at the same speed as the stationary set. All the sets might be movable independent of the drum 74, in which case each set will have its gear-roll. The splints are separated in substantially the same manner as in Fig. 4, and after being separated are discharged through a guide 78 into suitable holding means. In this case they are discharged into a carrier 79, substantially as shown in my Patent No. 656,014, or they may be discharged into any suitable frame or holding device to complete the matches.

It will be understood that the transfer-carrier 37 may be employed in connection with the separator shown in Fig. 9 and that such a separator might be substituted for the separator in Fig. 8, or that the transfer-carrier in Figs. 4 and 8 might be dispensed with and the splints discharged into any suitable holding means.

It will be also understood that the two opposed members of the separator might be yieldingly forced toward each other and that instead of all the sets of plates being positively driven one or more sets of one member might be loose and arranged to be driven by the opposed set or sets of the other member when they engage the splints.

In my application, Serial No. 737,186, filed November 16, 1899, the feature of intermeshing devices that carry and separate the splints into more than two independent rows and with or without plungers for forcing the separated splints into the dipping means is broadly claimed, while in my divisional application, Serial No. 52,005, filed March 20, 1901, a separator moving bodily, together with individual receivers and means for separating such receivers, is broadly claimed. A rotary separator having independent plates or members that carry the splints bodily and separate the splints into independent rows and that forces such rows into a carrier is broadly claimed in my application, Serial No. 40,001, filed December 15, 1900, and in my applications, Serial No. 41,818, filed January 2, 1901, Serial No. 45,044, filed January 28, 1901, Serial No. 54,618, filed April 6, 1901, and Serial No. 55,275, filed April 11, 1901, shows various forms of devices that carry the splint bodily and force the said separated splints into a dipping or holding carrier, and hence such means is not broadly claimed in this application, wherein the claims are limited to a certain class of separator and broadly to the combination of separating means, a carrying device, and plungers for forcing the splints from the carrying devices into the dipping means.

Fig. 14 shows a form of cutting device that might be used. The two parallel spindles 80 are provided with spaced cutters 81. The cutters are spaced apart the width of the splints by the washers 82 and are preferably beveled from one side only, the cutters of one spindle being made to overlap those of the other.

By the term "veneer" it will be understood that wood veneer or any material from which splints may be cut is included, and while a particular kind of splint is shown the latter may be of any suitable shape, according to the means employed for producing them.

Having thus fully described my invention, what I claim as new, and desire to secure by Letters Patent, is—

1. A match-making machine, comprising splint-cutting means, a separator having independent rotary plates or members receiving splints endwise, means for operating the plates to cause their peripheral surfaces to travel or move at substantially the same speed to separate the splints into independent rows, and holding means for the splints.

2. In a match-making machine, the combination with splint-cutting means, of a separator comprising opposed members each having splint-engaging devices receiving the splints endwise between them and engaging the splints with surfaces movable at the same speed and separating the splints into independent rows, and holding means for the splints.

3. A match-making machine, comprising splint-cutting means, a separator having independent rotary plates or members receiving splints endwise, means for operating the plates to cause their peripheral surfaces to travel or move at substantially the same speed to separate the splints into more than two independent rows, and holding means for the splints.

4. In a match-making machine, the combination with splint-cutting means, of a separator comprising opposed members each having splint-engaging devices receiving the splints endwise between them and engaging the splints with surfaces movable at the same speed and separating the splints into more than two independent rows, and holding means for the splints.

5. In a match-making machine, the combination with splint-cutting means, of a separator comprising opposed members each having independent rotary plates of the same diameter and receiving the splints endwise between them, means for operating the plates to separate the splints into independent rows, and holding means for the splints.

6. In a match-making machine, the combination with splint-cutting means, of a separator having eccentrically-arranged movable devices engaging the splints and separating them into independent rows, and holding means for the splints.

7. In a match-making machine, the combination with splint-cutting means, of a separator having independent rotary plates or members eccentrically arranged with respect to each other receiving the splints endwise and separating them into independent rows, and holding means for the splints.

8. In a match-making machine, the combination with a splint-cutting device cutting the splints in a close row and means for feeding veneer to the cutting device, of a separator having independent rotary circular plates or members receiving the splints endwise from the cutting device, means for operating the plates at the same peripheral speed to gradually shift the splints to separate them into independent rows, and holding means for the splints.

9. In a match-making machine, the combination with a splint-cutting device having knives spaced apart and cutting the splints in a close row and means for feeding veneer to the cutting device, of a separator having splint-engaging devices receiving the splints endwise between them and engaging them with surfaces movable at the same speed and gradually shifting the splints to separate them into independent rows, and holding means for the splints.

10. In a match-making machine, the combination with a splint-cutting device having knives or cutters spaced apart and cutting the splints in a close row and means for feeding veneer to the cutting device, of a separator comprising opposed members each having independent rotary plates of the same diameter receiving the splints endwise, means for operating the plates to separate the splints into independent rows, and holding means for the splints.

11. In a match-making machine, the combination with splint-cutting means, of a separator comprising opposed members each having independent rotary plates of the same diameter and receiving the splints endwise between them, means for operating the plates to separate the splints into more than two independent rows, and holding means for the splints.

12. In a match-making machine, the combination with splint-cutting means, of a separator having eccentrically-arranged movable devices engaging the splints and separating them into more than two independent rows, and holding means for the splints.

13. In a match-making machine, the combination with splint-cutting means, of a separator having independent rotary plates or members eccentrically arranged with respect to each other receiving the splints endwise and separating them into more than two independent rows, and holding means for the splints.

14. In a match-making machine, the combination with a splint-cutting device cutting the splints in a close row and means for feeding veneer to the cutting device, of a separator having independent rotary circular plates or members receiving the splints endwise from the cutting device, means for operating the plates at the same peripheral speed to gradually shift the splints to separate them into more than two independent rows, and holding means for the splints.

15. In a match-making machine, the combination with a splint-cutting device having knives spaced apart and cutting the splints in a close row and means for feeding veneer to the cutting device, of a separator having splint-engaging devices receiving the splints endwise between them and engaging them with surfaces movable at the same speed and gradually shifting the splints to separate them into more than two independent rows, and holding means for the splints.

16. In a match-making machine, the combination with a splint-cutting device having knives or cutters spaced apart and cutting the splints in a close row and means for feeding veneer to the cutting device, of a separator comprising opposed members each having independent rotary plates of the same diameter receiving the splints endwise, means for operating the plates to separate the splints into more than two independent rows, and holding means for the splints.

17. In a match-making machine, the combination with splint-cutting means, of a separator comprising opposed members each having independent rotary circular plates of the same diameter and receiving the splints endwise between them, means for operating the plates to separate the splints into independent rows, and holding means for the splints.

18. In a match-making machine, the combination with splint-cutting means, of a separator comprising two opposed members each having rotary circular plates provided with teeth and receiving the splints endwise between them, gears in mesh with the teeth of the plates of the members for operating said plates and separating the splints into independent rows, and holding means for the splints.

19. In a match-making machine, the combination with splint-cutting means, of a separator comprising opposed members each having independent rotary circular plates of the same diameter and receiving the splints endwise between them, means for operating the plates to separate the splints into more than two independent rows, and holding means for the splints.

20. In a match-making machine, the combination with splint-cutting means, of a separator receiving the splints endwise and dividing them into independent rows, a movable carrier receiving the independent rows of splints from the separator, a second carrier, and plungers for forcing the splints from the movable carrier into the second carrier.

21. In a match-making machine, the combination with splint-cutting means, of a separator dividing the splints into independent rows, a rotary carrier receiving the independent rows of splints endwise from the separator, a second carrier, and plungers for forcing the splints from the rotary carrier into the second carrier.

22. In a match-making machine, the combination with splint-cutting means, of a separator dividing the splints into independent rows, a rotary carrier receiving the independent rows of splints endwise from the separator, a second carrier, and plungers for forcing the splints from the rotary carrier into the second carrier.

23. In a match-making machine, the combination with a separator receiving the splints endwise and dividing them into independent rows, of a movable carrier receiving the independent rows of splints and moving them bodily away from the separator, a second carrier having means for holding splints, and plungers for forcing the splints from the first-mentioned carrier into the second carrier.

24. In a match-making machine, the combination with a separator dividing the splints into a series of independent rows and means for supplying splints to the separator, of a rotary carrier receiving the independent rows of splints endwise and moving the rows bodily away from the separator, a second carrier, and plungers for forcing the splints from the rotary carrier into the second carrier.

25. In a match-making machine, the combination with splint-cutting means, of a separator receiving the splints endwise and dividing them into more than two independent rows, a movable carrier receiving the independent rows of splints from the separator, a second carrier, and plungers for forcing the splints from the movable carrier into the second carrier.

26. In a match-making machine, the combination with splint-cutting means, of a separator dividing the splints into more than two independent rows, a rotary carrier receiving the independent rows of splints endwise from the separator, a second carrier, and plungers for forcing the splints from the rotary carrier into the second carrier.

27. In a match-making machine, the combination with a separator dividing the splints into a series of more than two independent rows and means for supplying splints to the separator, of a rotary carrier receiving the independent rows of splints endwise and moving the rows bodily away from the separator, a second carrier, and plungers for forcing the splints from the rotary carrier into the second carrier.

28. In a match-making machine, the combination with a separator dividing the splints into a series of independent rows and means for supplying splints to the separator, of a carrier having a series of sets of holding devices for the splints adapted to successively receive the sets of independent rows of splints from and moving such rows bodily at once clear of the separator, a second carrier, and plungers for successively forcing the sets of rows of splints from the first-mentioned carrier into the second carrier.

29. In a match-making machine, the combination with a separator dividing the splints into a series of independent rows and means for supplying splints to the separator, of a rotary carrier having a series of sets of holding devices for the splints adapted to successively receive the sets of independent rows of splints from and moving such rows bodily at once clear of the separator, a second carrier, and plungers for forcing the splints from the rotary carrier into the second carrier.

30. In a match-making machine, the combination with a separator dividing the splints into a series of more than two independent rows and means for supplying splints to the separator, of a carrier having a series of sets of holding devices for the splints adapted to successively receive the sets of independent rows of splints from and moving such rows bodily at once clear of the separator, a second carrier, and plungers for successively forcing the sets of rows of splints from the first-mentioned carrier into the second carrier.

31. In a match-making machine, the combination with splint-cutting means, of a separator comprising opposed members each having splint-engaging devices receiving the splints endwise between them and engaging the splints with surfaces movable at the same speed and separating the splints into independent rows, a movable carrier receiving the separated independent rows of splints, a second carrier, and plungers for forcing the splints from the movable carrier into the second carrier.

32. In a match-making machine, the combination with splint-cutting means, of a separator comprising opposed members each having splint-engaging devices receiving the splints endwise between them and engaging the splints with surfaces movable at the same speed and separating the splints into more than two independent rows, a movable carrier receiving the separated independent rows of splints, a second carrier, and plungers for forcing the splints from the movable carrier into the second carrier.

33. In a match-making machine, the combination with splint-cutting means, of a separator comprising opposed members each having independent rotary plates of the same diameter and receiving the splints endwise between them, means for operating the plates to separate the splints into independent rows, a movable carrier receiving the separated independent rows of splints, a second carrier, and plungers for forcing the splints from the movable carrier into the second carrier.

34. In a match-making machine, the combination with a splint-cutting device having knives spaced apart and cutting the splints in a close row and means for feeding veneer to the cutting device, of a separator having splint-engaging devices receiving the splints endwise between them and engaging them with surfaces movable at the same speed and gradually shifting the splints to separate them into independent rows, a movable carrier receiving the separate independent rows of splints, a second carrier, and plungers for forcing the splints from the movable carrier into the second carrier.

35. A match-making machine, comprising splint-cutting means, a separator having independent rotary plates or members receiving splints endwise, means for operating the plates to cause their peripheral surfaces to travel or move at substantially the same speed to separate the splints into independent rows, a rotary carrier receiving the separated independent rows of splints endwise, a second carrier, and plungers for forcing the splints from the rotary carrier into the second carrier.

36. A match-making machine, comprising splint-cutting means, a separator having independent rotary plates or members receiving splints endwise, means for operating the plates to cause their peripheral surfaces to travel or move at substantially the same speed to separate the splints into more than two independent rows, a rotary carrier receiving the separated independent rows of splints endwise, a second carrier, and plungers for forcing the splints from the rotary carrier into the second carrier.

37. In a match-making machine, the combination with splint-cutting means, of a separator having eccentrically-arranged movable devices engaging the splints and separating them into independent rows, a rotary carrier receiving the separated independent rows of splints endwise, a second carrier, and plungers for forcing the splints from the rotary carrier into the second carrier.

38. In a match-making machine, the combination with a splint-cutting device having knives or cutters spaced apart and cutting the splints in a close row and means for feeding veneer to the cutting device, of a separator comprising opposed members each having independent rotary plates of the same diameter receiving the splints endwise, means for operating the plates to separate the splints into independent rows, a rotary carrier receiving the separated independent rows of splints endwise, a second carrier and plungers for forcing the splints from the rotary carrier into the second carrier.

39. In a match-making machine, the combination with splint-cutting means, of a separator comprising opposed members each having splint-engaging devices receiving the splints endwise between them and engaging the splints with surfaces movable at the same speed and separating the splints into independent rows, a carrier having a series of sets of holding devices for the splints adapted to successively receive the sets of independent rows of splints from and moving such rows bodily at once clear of the separator, a second carrier, and plungers for successively forcing the sets of rows of splints from the first-mentioned carrier into the second carrier.

40. In a match-making machine, the combination with splint-cutting means, of a separator comprising opposed members each having splint-engaging devices receiving the splints endwise between them and engaging the splints with surfaces movable at the same speed and separating the splints into more than two independent rows, a carrier having a series of sets of holding devices for the splints adapted to successively receive the sets of independent rows of splints from and moving such rows bodily at once clear of the separator, a second carrier, and plungers for successively forcing the sets of rows of splints from the first-mentioned carrier into the second carrier.

41. In a match-making machine, the combination with splint-cutting means, of a separator comprising opposed members each having independent rotary plates of the same diameter and receiving the splints endwise between them, means for operating the plates to separate the splints into independent rows, a carrier having a series of sets of holding devices for the splints adapted to successively receive the sets of independent rows of splints from and moving such rows bodily at once clear of the separator, a second carrier, and plungers for successively forcing the sets of rows of splints from the first-mentioned carrier into the second carrier.

42. In a match-making machine, the combination with a splint-cutting device having knives spaced apart and cutting the splints in a close row and means for feeding veneer to the cutting device, of a separator having splint-engaging devices receiving the splints endwise between them and engaging them with surfaces movable at the same speed and gradually shifting the splints to separate them into independent rows, a carrier having a series of sets of holding devices for the splints adapted to successively receive the sets of independent rows of splints from and moving such rows bodily at once clear of the separator, a second carrier, and plungers for successively forcing the sets of rows of splints from the first-mentioned carrier into the second carrier.

43. In a match-making machine, the combination with splint-cutting means, of a separator comprising two opposed members each having splint-engaging devices receiving the splints endwise between them and engaging the splints with surfaces movable at the same speed and separating the splints into independent parallel rows at right angles to the plane in which the splints are cut, and holding means for the splints.

44. In a match-making machine, the combination with splint-cutting means, of a separator comprising two opposed members each having splint-engaging devices receiving the splints endwise between them and engaging the splints with surfaces movable at the same speed and separating the splints into more than two independent parallel rows at right angles to the plane in which the splints are cut, and holding means for the splints.

45. In a match-making machine, the combination with splint-cutting means, of a separator comprising two opposed members each having splint-engaging devices receiving the splints endwise between them and engaging the splints with surfaces movable at the same speed and separating the splints into independent parallel rows at right angles to the plane in which the splints are cut, a movable carrier receiving the separated independent rows of splints, a second carrier, and plungers for forcing the splints from the movable carrier into the second carrier.

46. In a match-making machine, the combination with splint-cutting means, of a separator comprising two opposed members each having splint-engaging devices receiving the splints endwise between them and engaging the splints with surfaces movable at the same speed and separating the splints into independent parallel rows at right angles to the plane in which the splints are cut, a rotary carrier receiving the separated independent rows of splints endwise, a second carrier and plungers for forcing the splints from the rotary carrier into the second carrier.

47. In a match-making machine, the combination with splint-cutting means, of a separator comprising two opposed members each having splint-engaging devices receiving the splints endwise between them and engaging the splints with surfaces movable at the same speed and separating the splints into more than two independent parallel rows at right angles to the plane in which the splints are cut, a movable carrier receiving the separated independent rows of splints, a second carrier, and plungers for forcing the splints from the movable carrier into the second carrier.

48. In a match-making machine, the combination with splint-cutting means, of a separator comprising two opposed members each having splint-engaging devices receiving the splints endwise between them and engaging the splints with surfaces movable at the same speed and separating the splints into more than two independent parallel rows at right angles to the plane in which the splints are cut, a carrier having a series of sets of holding devices for the splints adapted to successively receive the sets of independent rows of splints from and moving such rows bodily at once clear of the separator, a second carrier, and plungers for successively forcing the sets of rows of splints from the first-mentioned carrier into the second carrier.

49. In a match-making machine, the combination with splint-cutting means, of a separator comprising two opposed members each provided with independent rotary plates having the same peripheral speed and receiving the splints endwise between them, and means for operating the plates to separate the splints into independent parallel rows at right angles to the plane in which the splints are cut, and holding means for the splints.

50. In a match-making machine, the combination with splint-cutting means, of a separator comprising two opposed members each provided with independent rotary plates having the same peripheral speed and receiving the splints endwise between them, and means for operating the plates to separate the splints into more than two independent parallel rows at right angles to the plane in which the splints are cut, and holding means for the splints.

51. In a match-making machine, the combination with splint-cutting means, of a separator comprising two opposed members each provided with independent rotary plates having the same peripheral speed and receiving the splints endwise between them, and means for operating the plates to separate the splints into independent parallel rows at right angles to the plane in which the splints are cut, a movable carrier receiving the separated independent rows of splints, a second carrier, and plungers for forcing the splints from the movable carrier into the second carrier.

52. In a match-making machine, the combination with splint-cutting means, of a separator comprising two opposed members each provided with independent rotary plates having the same peripheral speed and receiving the splints endwise between them, and means for operating the plates to separate the splints into more than two independent parallel rows at right angles to the plane in which the splints are cut, a carrier having a series of sets of holding devices for the splints adapted to successively receive the sets of independent rows of splints from and moving such rows bodily at once clear of the separator, a second carrier, and plungers for successively forcing the sets of rows of splints from the first-mentioned carrier into the second carrier.

53. A match-making machine, comprising splint-cutting means, a separator having independent rotary plates or members receiving splints endwise, means for operating the plates to cause their peripheral surfaces to travel or move at substantially the same speed to separate the splints into independent rows, a second cutting device for cutting the splints transversely, and holding means for the splints.

54. In a match-making machine, the combination with splint-cutting means, of a separator comprising opposed members each having splint-engaging devices receiving the splints endwise between them and engaging the splints with surfaces movable at the same speed and separating the splints into independent rows, a second cutting device for cutting the splints transversely, and holding means for the splints.

55. A match-making machine, comprising splint-cutting means, a separator having independent rotary plates or members receiving splints endwise, means for operating the plates to cause their peripheral surfaces to travel or move at substantially the same speed to separate the splints into more than two independent rows, a second cutting device for cutting the splints transversely, and holding means for the splints.

56. In a match-making machine, the combination with splint-cutting means, of a separator comprising opposed members each having splint-engaging devices receiving the splints endwise between them and engaging the splints with surfaces movable at the same speed and separating the splints into more than two independent rows, a second cutting device for cutting the splints transversely, and holding means for the splints.

57. In a match-making machine, the combination with splint-cutting means, of a separator comprising opposed members each having independent rotary plates of the same diameter and receiving the splints endwise between them, means for operating the plates to separate the splints into independent rows, a second cutting device for cutting the splints transversely, and holding means for the splints.

58. In a match-making machine, the combination with a splint-cutting device cutting the splints in a close row and means for feeding veneer to the cutting device, of a separator having independent rotary circular plates or members receiving the splints endwise from the cutting device, means for operating the plates at the same peripheral speed to gradually shift the splints to separate them into independent rows, a second cutting device for cutting the splints transversely, and holding means for the splints.

59. In a match-making machine, the combination with a splint-cutting device having knives spaced apart and cutting the splints in a close row and means for feeding veneer to the cutting device, of a separator having splint-engaging devices receiving the splints endwise between them and engaging them with surfaces movable at the same speed and gradually shifting the splints to separate them into independent rows, a second cutting device for cutting the splints transversely, and holding means for the splints.

60. In a match-making machine, the combination with splint-cutting means, of a separator comprising opposed members each having independent rotary plates of the same diameter and receiving the splints endwise between them, means for operating the plates to separate the splints into more than two independent rows, a second cutting device for cutting the splints transversely, and holding means for the splints.

61. In a match-making machine, the combination with a splint-cutting device having knives or cutters spaced apart and cutting the splints in a close row and means for feeding veneer to the cutting device, of a separator comprising opposed members each having independent rotary plates of the same diameter receiving the splints endwise, means for operating the plates to separate the splints into more than two independent rows, a second cutting device for cutting the splints transversely, and holding means for the splints.

62. In a match-making machine, the combination with splint-cutting means, of a separator comprising two opposed members each having rotary circular plates provided with teeth and receiving the splints endwise between them, gears in mesh with the teeth of the plates of the members for operating said plates and separating the splints into independent rows, a second cutting device for cutting the splints transversely, and holding means for the splints.

63. In a match-making machine, the combination with splint-cutting means, of a separator comprising two opposed members each provided with independent rotary plates having the same peripheral speed and receiving the splints endwise between them, and means for operating the plates to separate the splints into independent parallel rows at right angles to the plane in which the splints are cut, a second cutting device for cutting the splints transversely, and holding means for the splints.

64. In a match-making machine, the combination with splint-cutting means, of a separator comprising two opposed members each provided with independent rotary plates having the same peripheral speed and receiving the splints endwise between them, and means for operating the plates to separate the splints into more than two independent parallel rows at right angles to the plane in which the splints are cut, a second cutting device for cutting the splints transversely, and holding means for the splints.

65. In a match-making machine, the combination with splint-cutting means, of a separator receiving the splints endwise and dividing them into independent rows, a second cutting device for cutting the splints transversely, a movable carrier receiving the independent rows of splints from the separator, a second carrier, and plungers for forcing the splints from the movable carrier into the second carrier.

66. In a match-making machine, the combination with splint-cutting means, of a separator dividing the splints into independent rows, a second cutting device for cutting the splints transversely, a rotary carrier receiving the independent rows of splints endwise from the separator, a second carrier, and plungers for forcing the splints from the rotary carrier into the second carrier.

67. In a match-making machine, the combination with splint-cutting means, of a separator receiving the splints endwise and dividing them into more than two independent rows, a second cutting device for cutting the splints transversely, a movable carrier receiving the independent rows of splints from the separator, a second carrier, and plungers for forcing the splints from the movable carrier into the second carrier.

68. In a match-making machine, the combination with splint-cutting means, of a separator comprising opposed members each having splint-engaging devices receiving the splints endwise between them and engaging the splints with surfaces movable at the same speed and separating the splints into independent rows, a second cutting device for cutting the splints transversely, a movable carrier receiving the separated independent rows of splints, a second carrier, and plungers for forcing the splints from the movable carrier into the second carrier.

69. A match-making machine, comprising splint-cutting means, a separator having independent rotary plates or members receiving splints endwise, means for operating the plates to cause their peripheral surfaces to travel or move at substantially the same speed to separate the splints into more than two independent rows, a second cutting device for cutting the splints transversely, a rotary carrier receiving the separated independent rows of splints endwise, a second carrier, and plungers for forcing the splints from the rotary carrier into the second carrier.

70. In a match-making machine, the combination with splint-cutting means, of a separator comprising opposed members each having independent rotary plates of the same diameter and receiving the splints endwise between them, means for operating the plates to separate the splints into independent rows, a second cutting device for cutting the splints transversely, a carrier having a series of sets of holding devices for the splints adapted to successively receive the sets of independent rows of splints from and moving such rows bodily at once clear of the separator, a second carrier, and plungers for successively forcing the sets of rows of splints from the first-mentioned carrier into the second carrier.

71. In a match-making machine, the combination with a splint-cutting device having knives spaced apart and cutting the splints in a close row and means for feeding veneer to the cutting device, of a separator having splint-engaging devices receiving the splints endwise between them and engaging them with surfaces movable at the same speed and gradually shifting the splints to separate them into independent rows, a second cutting device for cutting the splints transversely, a carrier having a series of sets of holding devices for the splints adapted to successively receive the sets of independent rows of splints from and moving such rows bodily at once clear of the separator, a second carrier, and plungers for successively forcing the sets of rows of splints from the first-mentioned carrier into the second carrier.

72. In match-making machinery, the combination with splint-cutting means of a movable carrier, means independent of the cutting means for delivering the splints endwise and properly separated to said carrier, a second dipping-carrier, and plungers for forcing the splints from the movable carrier into the second carrier.

73. In match-making machinery, the combination with a rotary carrier, means for delivering the splints endwise properly separated to said carrier, a second dipping-carrier, and plungers for forcing the splints from the rotary carrier into the second carrier.

74. In match-making machinery, the combination with a movable carrier, and means for delivering independent rows of splints endwise to said carrier, of a second dipping-carrier having means for holding the splints, and plungers for forcing splints from the first-mentioned carrier into the second carrier.

75. In match-making machinery, the combination with splint-cutting means, of a separator receiving the splints endwise and dividing the splints into independent rows, a second cutting device for cutting the material transversely, a movable carrier receiving the independent rows of splints from the separator, and a second carrier also movable and receiving the splints from the first-mentioned carrier.

J. A. EKIN CRISWELL.

Witnesses:
 WILLIAM FOSTER,
 A. W. STANLEY.